(12) United States Patent
Gouch et al.

(10) Patent No.: US 11,044,383 B2
(45) Date of Patent: Jun. 22, 2021

(54) METHOD OF PRINTING DIGITAL IMAGES

(71) Applicant: FFEI Limited, Hemel Hempstead (GB)

(72) Inventors: Martin Philip Gouch, Hempstead (GB); Jacqueline Margaret Deane, Langley (GB)

(73) Assignee: FFEI Limited, Hemel Hempstead (GB)

( * ) Notice: Subject to any disclaimer, the term of this patent is extended or adjusted under 35 U.S.C. 154(b) by 0 days.

(21) Appl. No.: 16/635,610

(22) PCT Filed: Aug. 1, 2018

(86) PCT No.: PCT/GB2018/052195
§ 371 (c)(1),
(2) Date: Jan. 31, 2020

(87) PCT Pub. No.: WO2019/025794
PCT Pub. Date: Feb. 7, 2019

(65) Prior Publication Data
US 2020/0238724 A1    Jul. 30, 2020

(30) Foreign Application Priority Data
Aug. 2, 2017  (GB) .................................. 1712442

(51) Int. Cl.
*B41J 2/205*     (2006.01)
*H04N 1/405*    (2006.01)
*B41J 2/21*      (2006.01)

(52) U.S. Cl.
CPC ............ *H04N 1/4057* (2013.01); *B41J 2/205* (2013.01)

(58) Field of Classification Search
CPC .................................................... H04N 1/4057
See application file for complete search history.

(56) References Cited

U.S. PATENT DOCUMENTS 7,347,529 B2    3/2008  Cheng et al.
2002/0105557 A1*  8/2002  Teshigawara .......... B41J 2/2125
                                                             347/15
(Continued)

FOREIGN PATENT DOCUMENTS

EP    2 003 870 B1    7/2016
JP    2012187812 A   * 10/2012

OTHER PUBLICATIONS

Written Opinion for PCT/GB2018/052195, dated Nov. 7, 2018.
International Search Report for PCT/GB2018/052195, dated Nov. 7, 2018.

*Primary Examiner* — Shelby L Fidler
(74) *Attorney, Agent, or Firm* — Sughrue Mion, PLLC

(57) ABSTRACT

A method of printing using a print head comprising first and second print arrays, each comprising a plurality of nozzles. Each of the first print array nozzles emits a droplet of a first volume and each of the second print array nozzles emits a droplet of a second volume, wherein the first volume is less than the second volume. The method comprises: a. receiving image data comprising a received tone value for a pixel; b. selecting one of the print arrays corresponding to the pixel location; c. mapping the received tone value to a mapped tone value using a tone mapping for the selected print array; d. comparing the mapped tone value with a threshold value for the location of the pixel; and e. generating a control signal for the selected print array if the mapped tone value corresponds to the threshold value in a predetermined manner.

19 Claims, 8 Drawing Sheets

(56) References Cited

U.S. PATENT DOCUMENTS

2005/0275675 A1* 12/2005 Kakutani ................ B41J 2/205
347/15
2006/0103691 A1 5/2006 Dietl et al.
2007/0291065 A1 12/2007 Shibata et al.

* cited by examiner

METHOD OF PRINTING DIGITAL IMAGES

CROSS REFERENCE TO RELATED APPLICATIONS

This application is a National Stage of International Application No. PCT/GB2018/052195 filed Aug. 1, 2018, claiming priority based on United Kingdom Patent Application No. 1712442.1 filed Aug. 2, 2017.

FIELD OF THE INVENTION

The present invention relates to the field of digital image printing. In particular, the present invention relates to a printing method in which two print arrays are used to emit droplets having different respective volumes.

BACKGROUND TO THE INVENTION

In conventional inkjet printing, a single print head comprising an array of nozzles is used to print circular dots onto a substrate so as to form a halftone printed image. The locations on the substrate where dots may be printed, but not necessarily are printed, are referred to herein as "dot locations". Multiple droplets of ink may be emitted onto the same dot location so as to produce dots of different sizes. Typically each of these droplets will contain the same volume of ink. When seven droplets are emitted per dot in a 360×360 dpi (dots per square inch) array, the ink deposited generally covers the substrate with no gaps so as to produce a fully saturated colour. In greyscale printing, lower levels of saturation are produced by printing fewer droplets per dot or combinations of droplets per dot in an area using a threshold array "screening" technique or a dither pattern.

If the nozzles are each configured to emit multiple droplets per dot, the print head must allow enough time for all possible droplets per dot to be emitted from the nozzles before being moved relative to the substrate onto another dot location. For example, if the upper limit is seven droplets per dot, each nozzle must be held over a given dot location by enough time for seven droplets to be emitted, even if fewer than seven droplets are actually emitted. Therefore in order to increase the speed of printing it has previously been suggested to reduce the maximum number of droplets emitted per dot. For example, if the maximum number of droplets per dot were reduced to four, rather than seven, the time required to deposit a line of drops would be 4/7th of the time to deposit seven droplets per dot. This corresponds to a speed increase of 7/4=1.75 times the previous speed. Printing fewer droplets per dot would mean that less ink would be deposited and so the printed output would appear less saturated.

One known way of addressing this reduction in saturation, whilst maintaining a faster print speed, is to use two print heads rather than one, with both print heads printing onto the same dot locations. For example, each head could print up to three droplets per dot, meaning that six droplets per dot are deposited in total. However as each head is only printing a maximum of three droplets per dot they can operate at an increased printing speed of 7/3=2.33 times the speed of a single head operating at seven droplets per dot.

FIGS. 1-4 graphically represent the printed output on a substrate for first and second print heads each emitting the maximum number of droplets allowed per dot location, in accordance with the prior art. The print direction along which the substrate is moved is indicated along the abscissa x-axis. The dotted circles 2 indicate the outer edges of the dots produced by the first print head, whereas the thicker dashed circles 4 indicate the outer edges of the dots produced by the second print head. In FIGS. 1 and 2 the nozzles of the two print heads can only emit up to three droplets per dot. In FIG. 1, the nozzles of the first and second print heads emit droplets onto the same dot locations, as the substrate is fed through the printer, so as to produce a 360×360 dpi array. In FIG. 2, the second head prints dots 4 in-between the dots 2 produced by the first head so as to create a 720×360 dpi array. In this second example the dots 2, 4 from both print heads partially overlap along the ordinate axis (perpendicular to the print direction) only. In both examples the same quantity of ink of six droplets is deposited per unit area. The same saturation is therefore achieved as a single head depositing six droplets per dot.

FIG. 3 illustrates the output of a 720×720 dpi printing mode in which two droplets are emitted per dot to obtain eight droplets per unit area. Here the printed dots partially overlap along the ordinate and abscissa axes. However, because the print heads are only printing two droplets per dot, the speed the heads are printing at is increased relative to the example where seven droplets per dot are emitted from single print head in a 360×360 dpi grid by a factor of $$\frac{360}{720} \times \frac{7}{2} = 1.75.$$

This is an improvement in speed, an increase in ink saturation, and an increase in print resolution.

It is desirable to make further improvements in speed of printing, however, in order to do so the maximum number of droplets per dot must be limited to one. If using a 720×720 dpi printing mode, this would mean only four droplets would be emitted per unit area. An example of the corresponding printed output is shown by FIG. 4. In this case the dots 2, 4 do not overlap along any direction and large gaps are left between the dots. Consequently, not enough ink is deposited to achieve full saturation.

U.S. Pat. No. 7,347,529 discusses the use of a print head comprising nozzles configured to emit droplets of different respective volumes onto the same dot locations so as to obtain three different sizes of dots on the substrate. Although time savings are achieved using this technique, it is desirable to improve the addressable printing resolution.

US 2006/0103691 A1 describes a fluid ejection device for an inkjet print head. The device comprises a first nozzle array and a second nozzle array each arranged along a respective line extending along the x-direction, said lines being parallel to each other. The first and second nozzle arrays have an equal pitch and the nozzles of the first nozzle array are offset with respect to the nozzles of the second array along the x-direction. The nozzles of the first nozzle array have a larger opening area than those of the second nozzle array for ejecting correspondingly larger droplets of ink in response to signals provided by a controller. The larger and smaller droplets will correspond to larger and smaller dot sizes correspondingly on the printed output. A method for converting image data into signals so as to form a printed image by operation of the fluid ejection device is not disclosed. Without suitable conversion techniques, visible aberrations in the printed output are likely to occur. For example, the print head may achieve a non-uniform deposition of ink with lines of the larger dot size and lines of the smaller dot size alternating in the image. This pattern may become visible in "light" areas of the printed image (where the printed dots will be more sparsely arranged).

Screening techniques are commonly used to prevent visual aberrations in a printed image, sometimes referred to as "rain". This can occur when a series of vertical lines or streaks are visible on a printed image because a group of neighbouring nozzles have repeatedly been instructed to print reduced ink quantities. EP 2003870 B describes a multi-level screening technique for drop emitting devices that are configured to emit multiple droplets per dot so as to control the printed dot size. A tone value is received from image data, mapped to a mapped tone value and compared to a threshold value in an iterative process wherein the number of iterations determines the number of droplets emitted per dot. This screening technique is applicable only for print heads where different diameter dots are obtainable for each pixel according to the number of droplets emitted.

It is an object of the invention to provide faster method of halftone printing without compromising the maximum saturation or resolution that may be achieved. It is a further object to avoid visible aberrations being formed in the printed image.

SUMMARY OF THE INVENTION

In a first aspect of the invention there is provided a method of producing a printed output on a substrate using a print head comprising first and second print arrays, wherein the first and second print arrays each comprise a plurality of nozzles, wherein each of the nozzles of the first print array is configured to emit a droplet of a first volume in response to a respective control signal, and wherein each of the nozzles of the second print array is configured to emit a droplet of a second volume in response to a respective control signal, wherein the first volume is less than the second volume, the method comprising the steps of:
  a. receiving image data comprising a received tone value for a pixel within an image to be printed;
  b. selecting one of the print arrays of the first and second print arrays comprising a nozzle corresponding to the location of the pixel within the image to be printed, wherein each nozzle of the first and second print array is arranged to print a different respective pixel in the image data;
  c. mapping the received tone value to a mapped tone value using a tone mapping corresponding to the selected first or second print array, wherein the tone mapping corresponding to the first print array is different from the tone mapping corresponding to the second print array;
  d. performing the screening operation by comparing the mapped tone value with a threshold value for the location of the pixel within the image to be printed; and
  e. generating a control signal for the selected print array if the mapped tone value corresponds to the threshold value in a predetermined manner.

The first and second print arrays are hence arranged within a common print head that may be arranged to print onto a substrate that moves relative to the print head along a print direction during a printing operation. Once emitted, each droplet will form a dot on the substrate having a diameter corresponding to the volume of the droplet. The first and second print arrays allow for different sized dots to be created without the need to emit more than one droplet per dot. Typically each said dot is formed from a single droplet. Each droplet of the first volume may therefore form a dot on the substrate having a first diameter, and each said droplet of the second volume may therefore form a dot on the substrate of having a second diameter, wherein the first diameter is less than the second diameter. This means that the print head only needs to be held over a given dot location by the time required for one droplet to be emitted before the substrate is moved relative to the print head along the print direction. The printing speed is therefore increased relative to the multiple droplets per dot prior art examples. The print resolution is also not compromised because the different dot sizes can still be produced close to one another.

By using a different tone mapping for each of the first and second print arrays, a variety of different perceivable grey levels may be achieved. Furthermore, the tone mappings can be selected so as to prevent the formation of visual aberrations in the printed image. For example, smaller dots are more difficult to discern in isolation than the larger dots. Therefore, if the received tone value corresponds to a light area of the image to be printed, it is advantageous to ensure that the first print array has a higher probability of printing than the second print array. The smaller and less noticeable dots will then be printed in preference to the larger dots in these regions, thereby preventing the formation of visible aberrations. Whether or not a droplet is emitted for each pixel will depend on the screening process of steps (c) to (e), and in particular on the threshold value for each pixel.

It is desirable to prevent the clustering of dots within light areas of a printed image as a cluster of smaller dots can simulate larger dots, which are easier for the human eye to resolve. Such clustering can occur in print heads such as EP 2003870 B where each nozzle is able to print dots of the smallest available size. If the smallest printed dots are separated by a minimum gap on the substrate, as fixed by the pitch of the first print array, the smaller dots may be prevented from becoming clustered. Preferably therefore the nozzles of the first print array are arranged along a first line and the nozzles of the second print array are arranged along a second line, wherein the first line is parallel with the second line. Preferably still the first and second print arrays have an equal pitch and the nozzles of the first print array are positioned in an alternating manner with respect to the nozzles of the second print array along the dimension in which the first and second lines extend. Therefore, if a droplet is emitted from each nozzle of the first and second print arrays onto a substrate, the dots of the first diameter and the dots of the second diameter alternate on the substrate along a direction perpendicular to the print direction. This arrangement can help to ensure that a desirable minimum spacing is maintained between adjacent dots produced by the first print array. For example, each print array may contain approximately 140 nozzles per centimetre so as to print at a resolution of 360 dpi. Each of the smaller dots may therefore be separated by at least 70 micrometres on the substrate. In light areas of the printed image (e.g. those corresponding to a lower received tone value) the printed dots will be more sparsely arranged and so this separation will be larger.

The first and second print arrays may have an equal pitch in the sense that the nozzles of the first print array are distally separated from each other by the same regular interval as each of the nozzles of the second print array. By alternating the arrangement of nozzles, it is possible to print an array of dots of alternating sizes using only one droplet per dot location. This alternating pattern of dots enables a high level of saturation to be obtained because the larger dots can be used to substantially occupy the space on the substrate left between adjacent smaller dots. This saturation may be equivalent to the prior art examples where multiple droplets per dot are emitted.

Preferably the tone mapping for each of the first and second print arrays is a function indicating the probability of control signal being generated according to the received tone value. Preferably still, said functions extend across three contiguous ranges of received tone values, wherein for a first range corresponding to lowest received tone values of the three contiguous ranges, the tone mapping corresponding to the first print array has a higher gradient than the tone mapping corresponding to the second print array. For example, for said first range the probability of a control signal being from the second print array may be zero. Therefore, if the received tone value falls within the first range and so corresponds to a light area of the image to be printed, a droplet can only be emitted from the first print array and not from the second print array. Visual aberrations may hence be avoided, as earlier discussed.

In an advantageous arrangement, the tone mapping corresponding to the first print array may have a positive gradient in each said range where the tone mapping corresponding to the second print array has a zero gradient, and wherein the tone mapping corresponding to the second print array may have a positive gradient in each said range where the tone mapping corresponding to the first print array has a zero gradient. Preferably still, the tone mapping corresponding to the first print array and the tone mapping corresponding to the second print array each may have a constant gradient within each of said three ranges.

Typically, for a third range corresponding to the highest received tone values of the three contiguous ranges, the tone mapping corresponding to the first print array has a positive gradient and the tone mapping corresponding to the second print array has a zero gradient, and for a second range extending between the first and third ranges, the tone mapping corresponding to the first print array has a zero gradient and the tone mapping corresponding to the second print array has a positive gradient. The tone mapping corresponding to the second print array may hence be larger than the tone mapping corresponding to the first print array in the third region. Therefore, if the received tone value falls within the third range and so corresponds to a dark area of the image to be printed, there may be a higher probability of a larger dots being generated than a smaller dot. Typically, the tone mapping corresponding to the second print array intersects the tone mapping corresponding to the first print array within the second region.

Step (c) may comprise multiplying the received tone value by a tone mapping value for the received tone value to obtain the mapped tone value. Step (d) may then comprise looking up the threshold value from a threshold array using the location of the pixel within the image to be printed. The threshold array may comprise a set of threshold values, wherein each said threshold value is assigned to a respective pixel within the image to be printed. An AM, FM or stochastic threshold array may be used. Most typically the set of threshold values spans from a minimum received tone value to a maximum received tone value. The mapped tone value may then correspond to the threshold value in the predetermined manner if the mapped tone value exceeds the threshold value for the location of the pixel within the image to be printed. A control signal may then be generated which indicates the nozzle corresponding to the location of the pixel within the image to be printed.

Advantageously the method may further comprise the following step: (f) printing a dot onto a substrate from the selected nozzle in response to the generated control signal. This preferably occurs automatically in response to the control signal being generated. Steps (a)-(f) are then typically performed for a plurality of pixels within the image to be printed so as to form a printed output in the form of an array of dots, wherein the array of dots comprises dots of a first diameter and dots of a second diameter, wherein the first diameter is different from the second diameter. This printed output may form a halftone image.

The array of dots typically comprises rows of dots for the first and second diameters, wherein the first and second print arrays are actuated at different times so as to form each said row of dots. The nozzles of one print array may hence be used to print dots between existing dots that have already been printed by the other print array. Higher printing resolutions may therefore be obtained. For example, in a particularly advantageous arrangement, the first print array is configured to print at a resolution of 360 dots per square inch and the second print array is configured to print at a resolution of 360 dots per square inch. The first and second print arrays may then be actuated at different times so as to print a row of dots at a resolution of 720 dots per square inch.

The nozzles may each comprise a chamber and an actuator, for example in the form of a piezoelectric element. The actuator is actuated in response to the control signal to cause the emission of a droplet from the chamber of the nozzle. Each said droplet is typically formed from a single droplet emission cycle of the actuator.

Most typically, the dots of the first diameter and the dots of the second diameter are collinearly arranged on the substrate along said direction perpendicular to the print direction. However, this does not mean that the nozzles of the first print array and the nozzles of the second print array need to be arranged along a common line (although they may be). Preferably the first line and the second line (along which the first and second print arrays are respectively arranged) are not collinear. For example, the nozzles of the first array may be staggered with respect to the second array along the dimension in which the first and second lines extend. Due to the physical space constraints associated with each nozzle, this arrangement may advantageously allow for the nozzles to be packed more closely together, thereby increasing the printing resolution which is attainable. In this case, the first and second print arrays may be configured to emit droplets at different times, as the substrate is moved, in order to form a row of printed dots along a line perpendicular to the print direction formed of dots of the first and second diameters. The first and second print arrays are typically arranged over different areas of the substrate and so the first and second print arrays may emit droplets simultaneously (i.e. onto different areas of the substrate), however, at least two such emissions would be required in order to form a complete row formed of dots of the first and second diameters extending perpendicular to the print direction.

Each nozzle of the first print array is preferably arranged midway between adjacent nozzles of the second print array, along the dimension on which the first and second lines extend. This ensures that the dots of the first diameter are each spaced midway between two neighbouring dots of the second diameter. Similarly, the dots of the second diameter may then each be spaced midway between two neighbouring dots of the first diameter. A regular print pattern may therefore be obtained.

Preferably the nozzles of the first print array are arranged along first and second rows, and the nozzles of the second print array are arranged along third and fourth rows, wherein the nozzles within each said row are arranged at an equal pitch, and each said nozzle of the first and second print arrays is arranged at a different position along the dimension in which the first and second lines extend. Due to space restrictions associated with each nozzle, this arrangement enables a higher print resolution to be obtained. Typically each nozzle of the first row is arranged midway between adjacent nozzles of the second row along the dimension in which the first and second lines extend, and each nozzle of the third row is arranged midway between adjacent nozzles of the fourth row along the dimension in which the first and second lines extend. A regular print pattern may therefore be obtained.

The diameter of the dot will depend to a certain extent on the properties of the substrate onto which the droplet is emitted, for example its wettability and surface topology, as well as on the kinetic energy of the ejected droplet. Desirable dots sizes can typically be obtained however wherein the first volume is in the range of 4-8 picolitres and wherein the second volume is in the range of 10-14 picolitres. Preferably still the first volume is 6 picolitres and the second volume is 12 picolitres. In a general sense however the second volume is typically twice the magnitude of the first volume, although other ratios are also envisaged.

In a basic implementation, the print head is configured for greyscale printing using only a single colour of ink (for example cyan, magenta or yellow, but most typically black). Preferably therefore the first and second print arrays may be configured to draw ink from a common ink reservoir. This simplifies the construction of the print head and any printing apparatus to which it is installed.

BRIEF DESCRIPTION OF THE DRAWINGS

Embodiments of a method according to the invention will now be discussed with reference to the accompanying drawings in which.

DETAILED DESCRIPTION

Print Head

Figure 5:
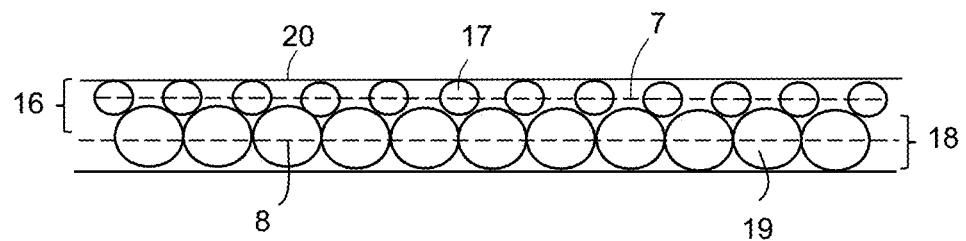
FIG. 5 is an illustration of the end view of a first example of a print head for use in accordance with an embodiment.

A schematic end view of a first example of a print head 20, suitable for use in a method according to an embodiment of the invention, is illustrated by FIG. 5. The print head 20 is configured to emit ink droplets onto a substrate during a printing operation so as to form a printed image. The print head 20 comprises a first print array 16 having a plurality of regularly spaced nozzles 17 arranged along a first line 7. Each of the nozzles 17 of the first print array 16 is configured to emit a droplet of ink of a first volume in response to a respective control signal. The print head 20 comprises a second print array 18 having a plurality of nozzles 19 arranged along a second line 8. The first line 7 extends along a direction parallel to the second line 8, and so along the same dimension as the second line 8. This dimension extends in a direction perpendicular to the direction of travel the substrate during the printing operation. The substrate is moved relative to the print head 20 along a print direction during the printing operation by a feed mechanism, as is conventional in the art.

According to current techniques around 140 nozzles may be provided per cm along a print array. This equates to a nozzle pitch of around 70 micrometres and a printing resolution of 360×360 dpi. In the first example, the first and second print arrays 16, 18 both have a pitch of around 70 micrometres, however the nozzles 17 of the first print array 16 are staggered with respect to the nozzles 19 of the second print array 18 in an alternating manner by half a dot pitch. The nozzles 17 of the first print array 16 are therefore displaced with respect to the nozzles 19 of the second print array 18 by 35 micrometres. The first line 6 is laterally spaced from the second line 7 and each nozzle 17 of the first print array 16 is provided between two adjacent nozzles 19 of the second print array 18 along the dimension on which the first and second lines 7, 8 extend. The first and second lines 6, 7 are therefore non-intersecting. Furthermore the first and second print arrays 16, 18 abut each other. Due to space restrictions associated with each nozzle, this provides a more tightly-packed arrangement of print nozzles and so a higher attainable printing resolution.

Although only 12 nozzles 17 are illustrated in the first print array 16 and 11 nozzles 18 in the second print array 18, this is for clarity only. Typically each of the print arrays 16, 18 may comprise 500 or 1000 nozzles. If 1000 nozzles are provided for each of the print arrays 16, 18 then a 7 cm swathe may be printed on the substrate by the print head 20 during each printing operation.

The nozzles 17, 19 each form part of a respective drop emitting device for an inkjet printer. Said drop emitting devices may therefore each comprise an ink chamber and an actuator in the form of a piezoelectric element to control the emission of droplets of ink from the ink chamber. The invention finds particular benefit in the field of greyscale printing and so each of the nozzles 17, 19 (and more specifically each of the ink chambers) may be arranged to receive and emit ink from a common ink reservoir, for example containing black ink. Each nozzle is configured to emit a droplet of said ink in response to a respective control signal, wherein said control signal, which may be fed to the respective piezoelectric element. The control signal is typically a binary signal wherein a "high signal" or "1" indicates print and a "low signal" or "0" indicates do not print.

Each of the nozzles 19 of the second print array 18 is configured to emit a droplet of ink of a second volume in response to a respective control signal, wherein the second volume is larger than the first volume. In the present example the first volume is 6 picolitres and the second volume is 12 picolitres. The nozzles 17 of the first print array 16 are therefore shown as having a smaller aperture than the nozzles 19 of the second print array 18 so as to enable this difference in the droplet volume.

Figure 6:
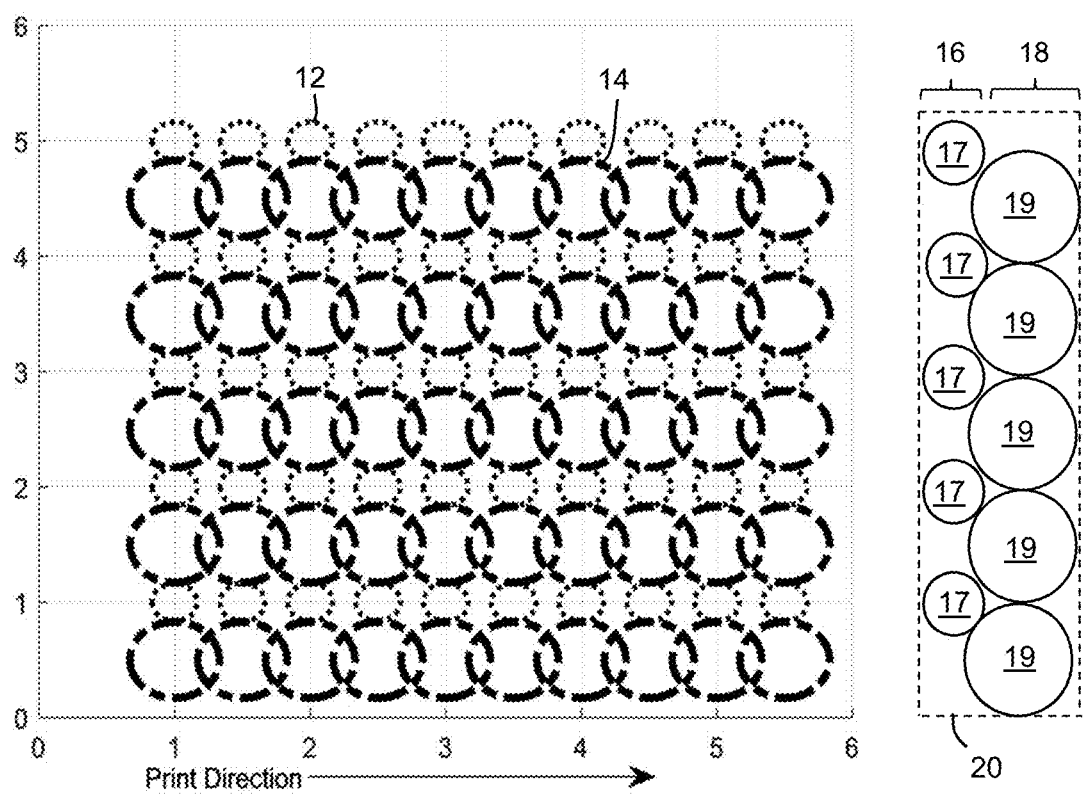
FIG. 6 is a schematic illustration of a 720×720 dpi printed grid obtained using the print head of the first example.

FIG. 6 graphically represents the printed output on a substrate achieved when a droplet of ink is emitted onto a substrate by the print head 20 of the first example so as to form a dot for each pixel within a 720×720 dpi grid. The print direction along which the substrate is moved is indicated along the abscissa x-axis. The dotted circles 12 indicate the outer edges of the dots produced by the first print array 16, whereas the thicker dashed circles 14 indicate the outer edges of the dots produced by the second print array 18.

The droplets emitted by the nozzles 19 of the second print array 18 will form dots 14 that have a larger diameter than those of the dots 12 that are formed by the nozzles 17 of the first print array 16. The difference in the diameter will depend, amongst other things, on the properties of the substrate and the energy and viscosity of emitted the ink. In FIG. 6 the diameter of the dots 14 formed by the second print array 18 are approximated for illustration purposes as being roughly twice the diameter of the dots 12 formed by the first print array 16. Typically however a 2:1 difference in volume would give rise to a smaller difference in dot diameter. Typically droplets of 6 picolitres will form dots 12 having a diameter between 80 and 100 micrometres and droplets of 12 picolitres will form dots 14 with a diameter between 100 and 130 micrometres.

Illustrated alongside the printed output, to the right-hand side of the substrate, is a section of a schematic end view of the print head 20. The print head 20 is arranged such that each of the nozzles 17, 19 of the first and second print arrays 16, 18 is aligned along the print direction with the respective set of dots 12, 14 which it prints during a printing operation.

When a droplet is emitted at every dot location (and so for every pixel location in the digital image), as is the case in FIG. 6, the dots are arranged on the substrate such that the smaller dots 12 alternate with the larger dots 14 along the ordinate direction. This corresponds to the alternating arrangement of the nozzles 17, 19 along the dimension on which the first and second lines 7, 8 extend. The alignment of the smaller dots 12 with the larger dots 14 along the ordinate is achieved by actuating the second print array 18 at a different time from the first print array 16 depending on the velocity of the substrate relative to the print head 20.

Figure 1:
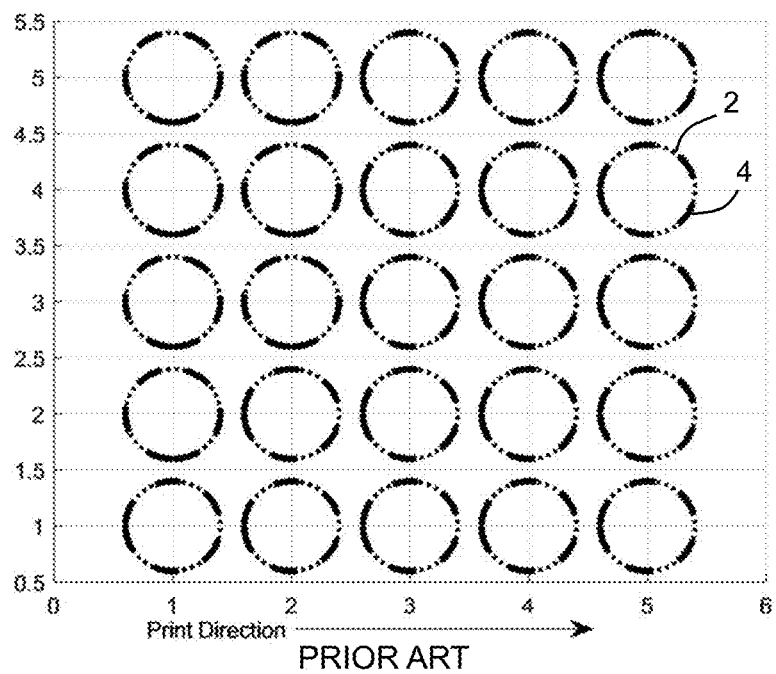
FIG. 1 is a schematic illustration of a 360×360 dpi printed grid obtained in a first prior art example.
Figure 2:
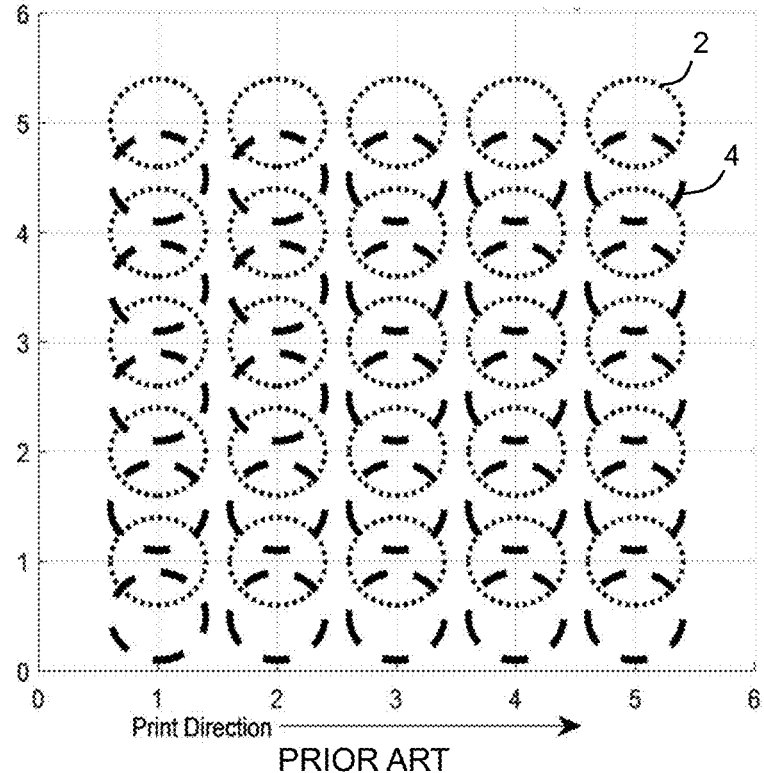
FIG. 2 is a schematic illustration of a 720×360 dpi printed grid obtained in a second prior art example.
Figure 3:
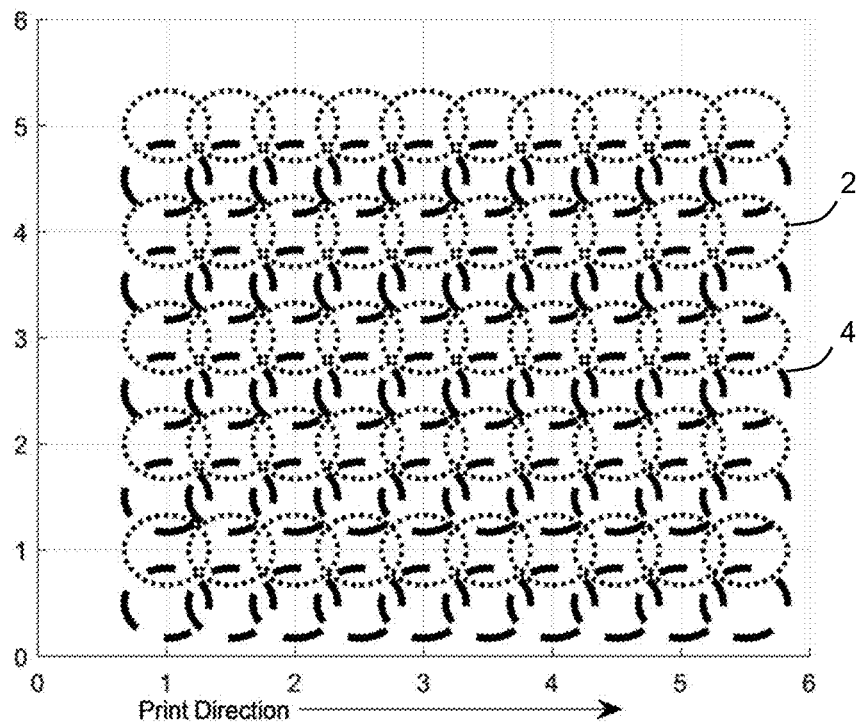
FIG. 3 is a schematic illustration of a 720×720 dpi printed grid obtained in a third prior art example.
Figure 4:
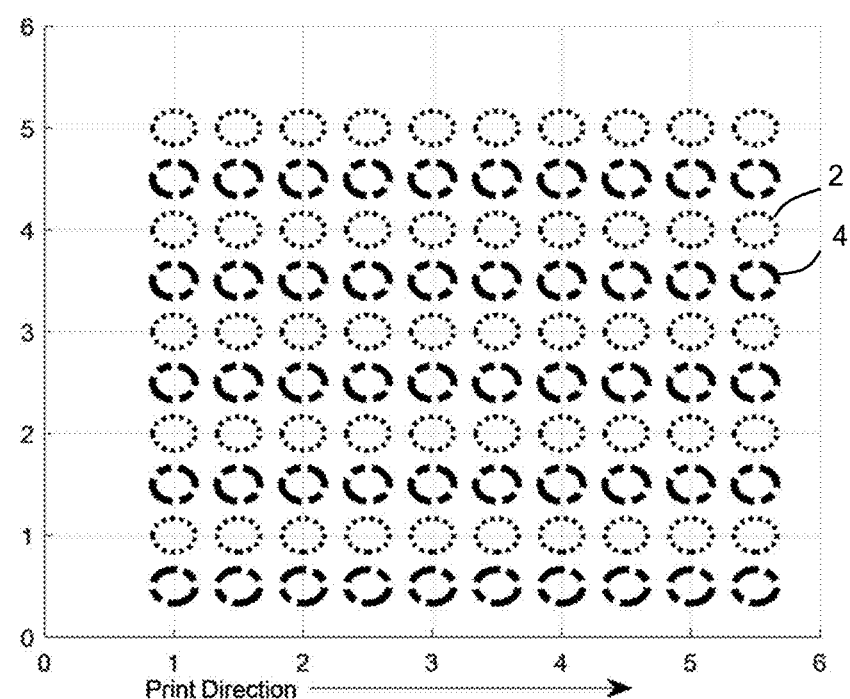
FIG. 4 is a schematic illustration of a 720×720 dpi printed grid obtained in a fourth prior art example.

Since each nozzle 17, 19 is only configured to emit one droplet per dot, the substrate can be moved by a higher velocity than is achievable in prior art examples where multiple droplets are emitted per dot. This is because the print head 20 no longer has to wait for the maximum possible number of droplets to be emitted per pixel location before moving onto the next location over the substrate. The speed of printing of such an arrangement in comparison to the prior art example discussed in connection with FIG. 1 is $$\frac{360}{720} \times 7 = 3.5$$

times faster. Note that the factor of $$\frac{360}{720}$$

arises because the twice as many dots are printed per unit area. Furthermore, a higher printing resolution can be achieved than in the prior art example discussed in relation to FIG. 4 because different dot sizes can be produced. FIG. 6 illustrates that the larger dots 14 formed by the second print array may be arranged relative to one-another so as to partially overlap along the print direction. The smaller dots 12 of the first print array 16 do not overlap each other along this direction due to their smaller diameters. However, the smaller dots 12 substantially occupy the area on the substrate left between each of the larger dots 14. In the present example, the edges of the smaller dots 12 abut onto the edges of the larger dots 14, with only small "unprinted" gaps being left on the substrate along the print direction between each of the smaller dots 12. The overall amount of ink emitted per unit area, which corresponds to the printing resolution is therefore equivalent to the examples discussed in relation to FIGS. 1 and 2.

Figure 7:
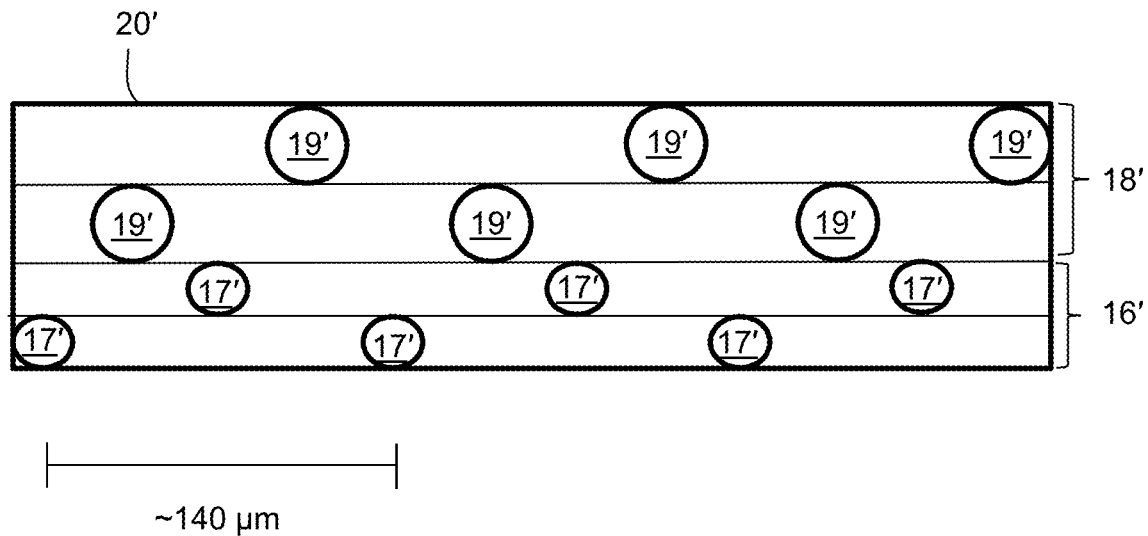
FIG. 7 is a schematic illustration of a second example of a print head for use in accordance with an embodiment.

In reality, it is often practically difficult to arrange the nozzles in the closely packed arrangement illustrated by FIGS. 5 and 6. High printing resolutions may instead be achieved by staggering the nozzles within each individual print array. FIG. 7 schematically illustrates an end view of a second example of print head 20' where this is the case. Primed reference numerals have been used here to show like features from FIGS. 5 and 6. The second example broadly matches the first example however in the second example the first and second print arrays 16', 18' each comprise two rows of nozzles. Four rows are therefore provided in total, each said row extending along the same dimension. Each row is formed of nozzles that are separated from each other by a common, regular pitch of around 140 micrometres. This equates to a printing resolution of 180 dpi. These two rows are actuated at different times, as the substrate moves along the print direction, so as to form a line of printed dots of the smaller diameter at a resolution of 360 dpi. The two rows of the second print array 18' are similarly arranged and controlled to form a line of printed dots of the larger diameter at a resolution of 360 dpi. The first and second print arrays 16', 18' are staggered with respect to each other; i.e. the nozzles 19' of the second print array 18' are displaced with respect to the nozzles 17' of the first print array 16' by half the pitch of the first and second print arrays 16', 18'. The first and second print arrays 16', 18' are then actuated at different times so as to form a printed output comprising printed lines formed of dots of alternating sizes in a direction perpendicular to the print direction at a resolution of 720 dpi, as per the example in FIG. 6. Each nozzle of the first and second print arrays 16', 18' is therefore arranged to cover a different area on the substrate during a printing operation. Equivalently this may be thought of as each of the nozzles corresponding to a different set of dot locations within the 720×720 dpi array, wherein the set extends along the print direction and is one dot wide.

The printed output illustrated by FIG. 6 corresponds to a "black" region of the printed image wherein a droplet of ink is emitted for each pixel location. However, lighter areas may be formed by printing fewer droplets per unit area, as is common in halftone printing. The decision as to whether or not to emit a droplet of ink for a given pixel location will be based on a halftone screening process. A basic background discussion of known halftone screening techniques will now be provided for the reader's benefit.

Halftone Screening

Many printing processes are binary in that they can only print ink or not print ink. To produce apparent grey levels it is normal to print at a resolution beyond the resolution that is resolvable by the eye. The eye will average the printed dots printed within its resolution limit. Taking a print resolution of 1 micrometres, if the if the resolvable limit of the eye is 100 micrometres, there are up to 7854 dots that will fit within the resolvable area and from which the eye will perceive an average. Thus by controlling the numbers of printed dots (or in other words the number of dark or light print pixels) within a given area, 7854 apparently different grey levels may be produced.

The process of deciding on whether or not to print a dot for each pixel of a greyscale image is called halftone screening. By convention in this document we will use 0 to indicate no printing and 1 to indicate ink being printed. A greyscale image will have 1024 levels of grey in a greyscale range extending from 0 for white and 1024 for black. One method of performing halftone screening is with a threshold array which is used because it is very efficient to execute.

Figure 8:
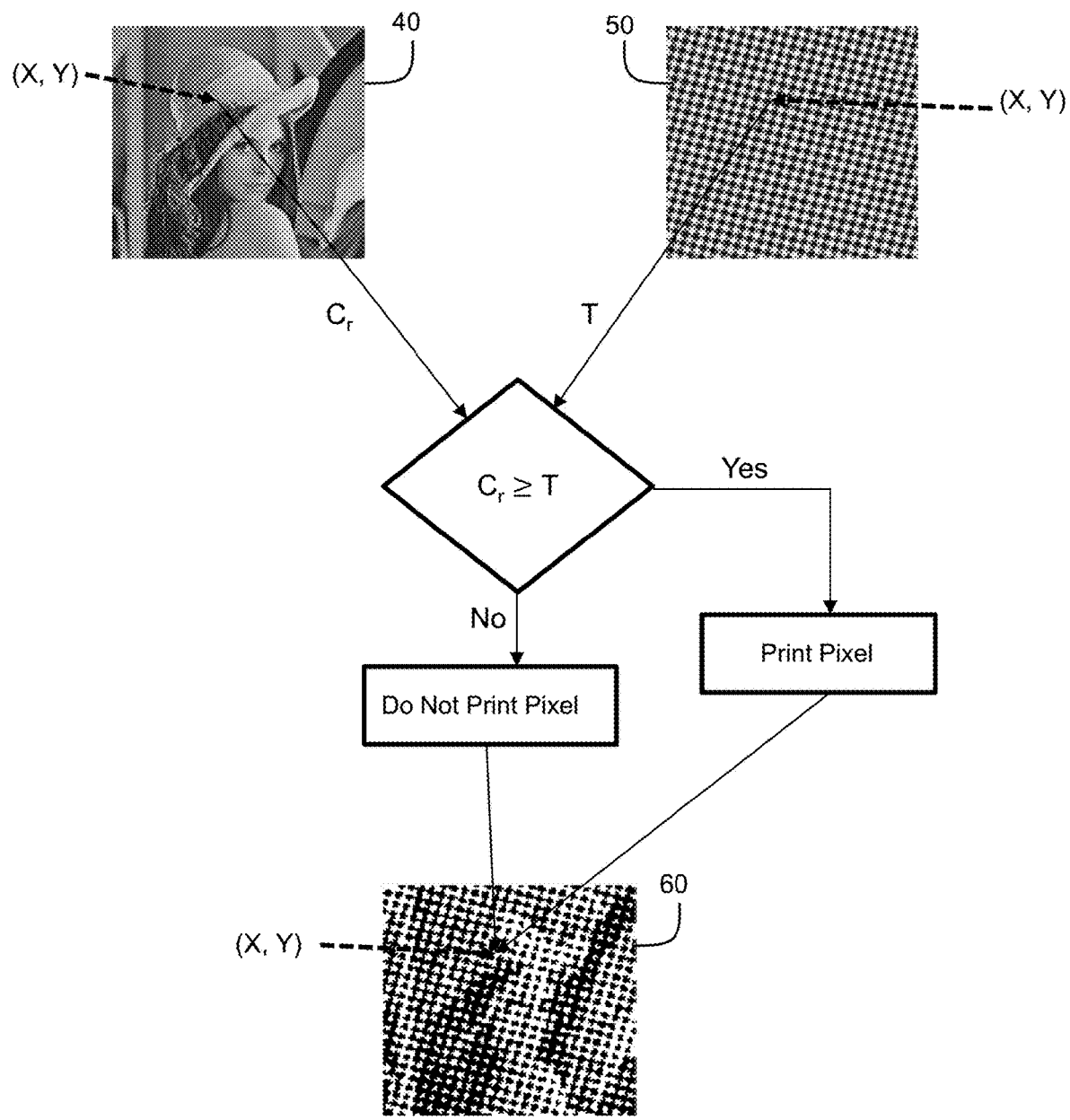
FIG. 8 is an illustration of the steps in a screening method in accordance with a fifth prior art example.

The first step of halftone screening a greyscale image is to resize it to the print pixel if it is not already at that resolution so that for every dot (i.e. "print pixel") there is a corresponding greyscale pixel. This is the input image to the process for which a decision will need to be made one whether to print a black pixel or not to print and so create a white pixel. A threshold array is obtained with which the greyscale of each pixel in the input image is compared. This threshold array has a pattern in it designed to distribute the selection of the printed pixels. It may have what is called an AM pattern which clusters the printed pixels into a uniform pattern or it may be designed to minimise the clustering of the printed pixels in what is called an FM or stochastic pattern. An example of an AM threshold array 50 is illustrated in FIG. 8.

The resized input image 40 is formed of grey levels 0 to 1024 where white is 0 and black is 1024. The grey levels for the input image 40 are referred to as tone values Cr and correspond to the "intensity" of a given colour (in this case black) in the input image 40.

The threshold array 50 is a two-dimensional array that contains data configured so as to generate a screening pattern on the substrate. The threshold array has the same tonal range as the input image 40. If the threshold array 50 is the same size or larger than the greyscale image 40 the tone value Cr of each pixel location (X, Y) from the input image 40 is then compared to corresponding threshold value for the same pixel location (X, Y) of the threshold array 50 in the decision making process illustrated by FIG. 8.

The system receives a pixel of image data and also receives the pixel's X and Y position within the image to be printed 40. The X and Y positional information provides a set of indices with which to retrieve a threshold value T from the two-dimensional threshold array 50. This threshold value T can be thought of as the grey level for the threshold array 50 at this pixel location. The system also extracts the tone value Cr from the image data for the relevant pixel location. The tone value Cr is then compared with the threshold value T using a binary comparator. If the tone value Cr is greater than or equal to the threshold value T for that pixel location, a decision is made to print the pixel and a control signal will be issued accordingly. Otherwise, a decision is made not to print that pixel.

The process is repeated for each pixel in a given scan line, and then for each of the scan lines within the image. As the X and Y positional data for each pixel will vary, a number of different threshold values will be generated. Eventually this produces the binary, screened image 60. For illustration purposes, a low resolution threshold array 50 has been used in FIG. 8 to obtain the low resolution screened image 60. Higher resolution threshold arrays 50 are typically used in practice however to produce higher resolution screened images than that which is shown by FIG. 8. An example of a higher resolution FM threshold array is provided in FIG. 12.

Screening & Printing Method

A first embodiment method of performing halftone screening and then printing a digital image onto a substrate will now be discussed with reference to FIGS. 5, 6 and 8-11. The method is performed here by a system comprising an inkjet printer having a print head 20 according to the first example but is equally applicable with the print head 20' of the second example. The system further comprises an electronic controller comprising one or more processors and memory (both volatile and non-volatile) containing instructions which when executed by the processor cause the print head to execute the following method. The electronic controller may optionally form part of a separate computing device from the inkjet printer.

Figure 9:
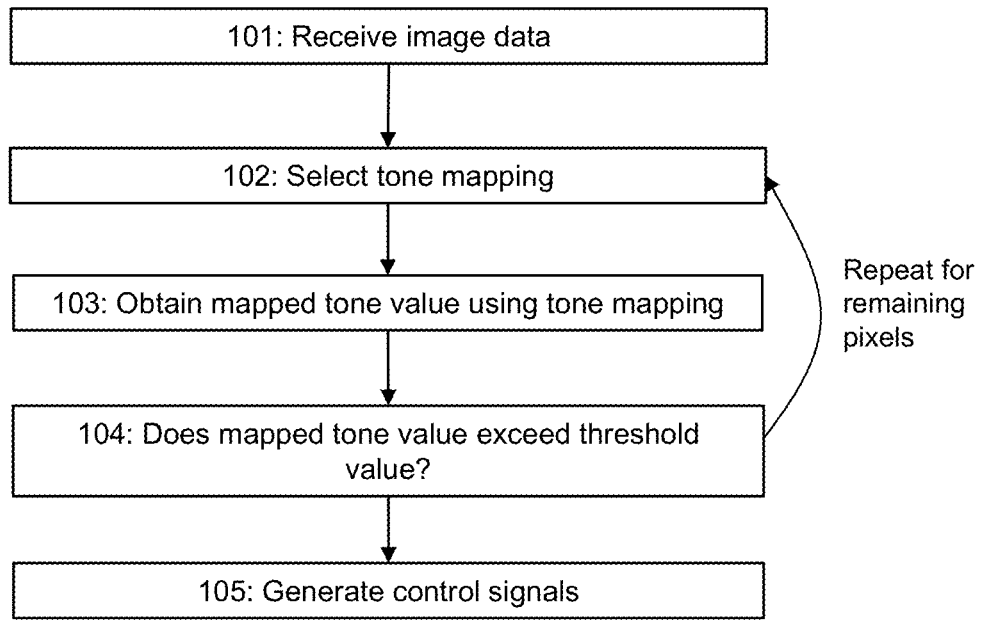
FIG. 9 is a an illustration of a printing method in accordance with a first embodiment.

The method begins at step 101 of FIG. 9 wherein preprocessed image data is received. This image data comprises a digital image to be printed which has been resized so that each digital pixel corresponds to a respective "dot location" on the substrate where a dot may or may not be printed by the print head 20. For the purposes of this embodiment, the print head 20 is arranged stationary such that, as the substrate is moved under the print head 20 and along the print direction, each nozzle 17, 19 of the first and second print arrays 16, 18 is configured to print a different respective set of dots extending along the print direction, as shown in FIG. 6. Accordingly, each pixel along a scan line of the digital image extending perpendicular to the print direction (and long the dimension in which the first and second lines 7, 8 extend) corresponds to a different respective nozzle 17, 19 in that only this nozzle may or may not print the pixels for this scan line. Optionally, a plurality of print heads 20 may be aligned next to one-another across the width of the substrate so that an area on the substrate wider than the width of a single print head 20 can be printed in a single printing pass. In other embodiments the print head 20 may be moved over a stationary substrate, for example along a serpentine path, so as to print across the entire area of the substrate.

The image data is processed one scan line at a time, each said scan line extending in a direction perpendicular to the print direction. A screening method is performed for each pixel along these scan lines. Firstly a received tone value Cr is obtained for a pixel together with the location of the pixel within the digital image. A threshold value T is also obtained from a threshold array using the position of the pixel within the digital image. If necessary the threshold array is resized or preferably tessellated to fit the digital image so that for every pixel location there is a corresponding threshold value.

Each pixel location corresponds to a nozzle of the first or second print arrays 16, 18, as earlier discussed. The print array corresponding to a given pixel is selected and, at step 102, a tone mapping is selected based on the selected print array. This may be achieved by assigning each pixel along the scan line with either a first tone mapping or a second tone mapping in an alternating manner, wherein the first and second tone mappings correspond to the first and second print arrays 16, 18 respectively.

Figure 10:
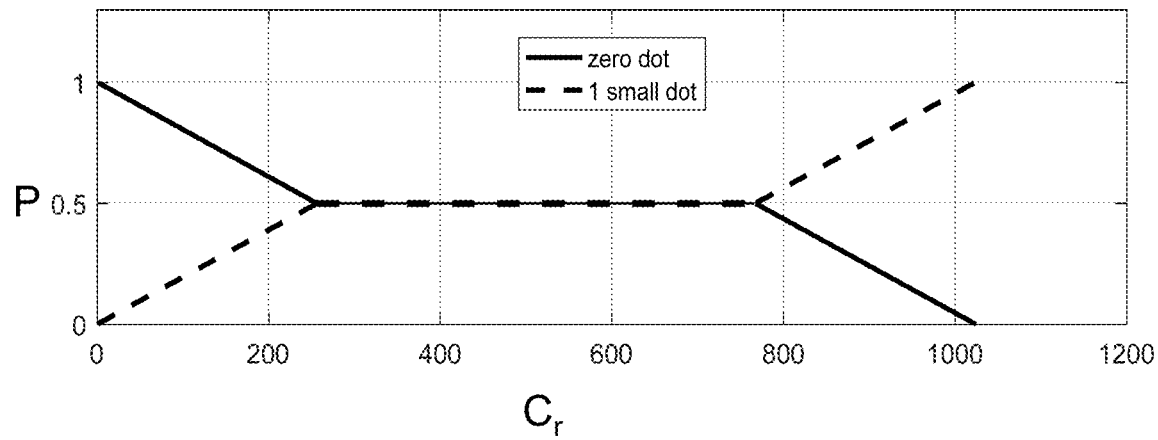
FIG. 10 is a graph illustrating a tone mapping for a first print array in accordance with the printing method of the first embodiment.
Figure 11:
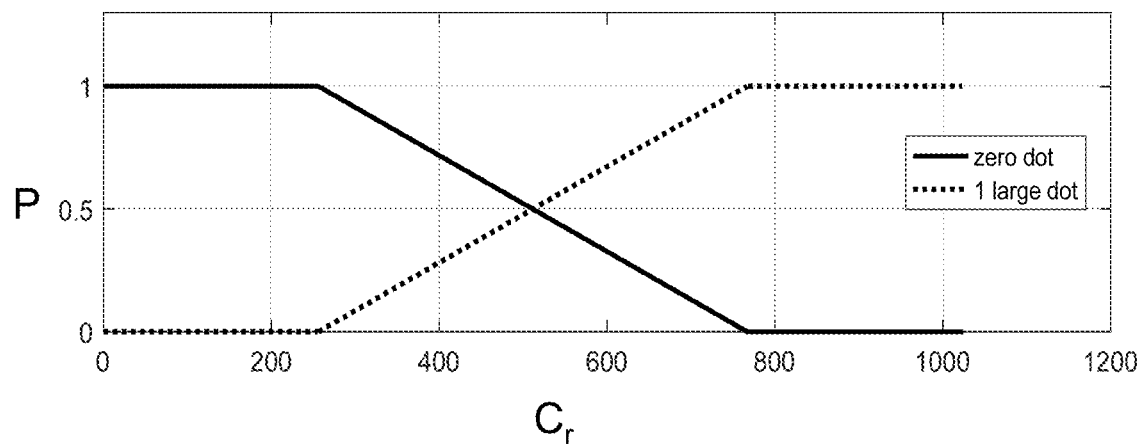
FIG. 11 is a graph illustrating a tone mapping for a second print array in accordance with the printing method of the first embodiment.

FIG. 10 illustrates an exemplary tone mapping function corresponding to the first print array 16 whereas FIG. 11 illustrates an exemplary tone mapping function corresponding to the second print array 18. These tone mapping functions are indicated by the dashed and dotted lines. For each received tone value Cr (shown along the x-axis) there exists a tone mapping value P (shown along the y-axis) ranging between 0 and 1. The first print array 16 is configured to print small dots 12 whereas the second print array 18 is configured to print large dots 14. The tone mapping function for the first print array 16 rises at a constant gradient from P=0 to P=0.5 for tone values between 0 and 264 whereupon it remains constant at P=0.5 for all tone values between 264 and 764. The tone mapping function then increases again at a constant gradient from P=0.5 to P=1 for tone values between 764 and 1028. The tone mapping function for the second print array 18 is constant at P=0 for all tone values between 0 and 264. It then rises at a constant gradient between P=0 to P=1 for tone values between 264 and 764, whereupon it remains constant at P=1 for all tone values between 764 and 1028.

At step 103 a mapped tone value is obtained using the selected tone mapping. This is achieved by looking up the tone mapping value from the tone mapping function according to the received tone value Cr of the pixel. The tone value Cr is then multiplied by the tone mapping value to obtain a mapped tone value Cm.

At step 104 a decision is made as to whether a droplet of ink should be emitted at the dot location corresponding to the pixel. The mapped tone value Cm for is compared to the threshold value T for the given pixel location. If the mapped tone value Cm corresponds to the threshold value T in a predetermined manner, for example it is greater than or equal to the threshold value, a droplet of ink should be emitted from the corresponding nozzle at the dot location corresponding to the pixel location. If the mapped tone value Cm does not correspond to the threshold value T in the predetermined manner, for example it is less than the threshold value, a droplet should not be emitted at the dot location corresponding to the pixel location. The outcome of this decision is stored in the memory.

Figure 12:
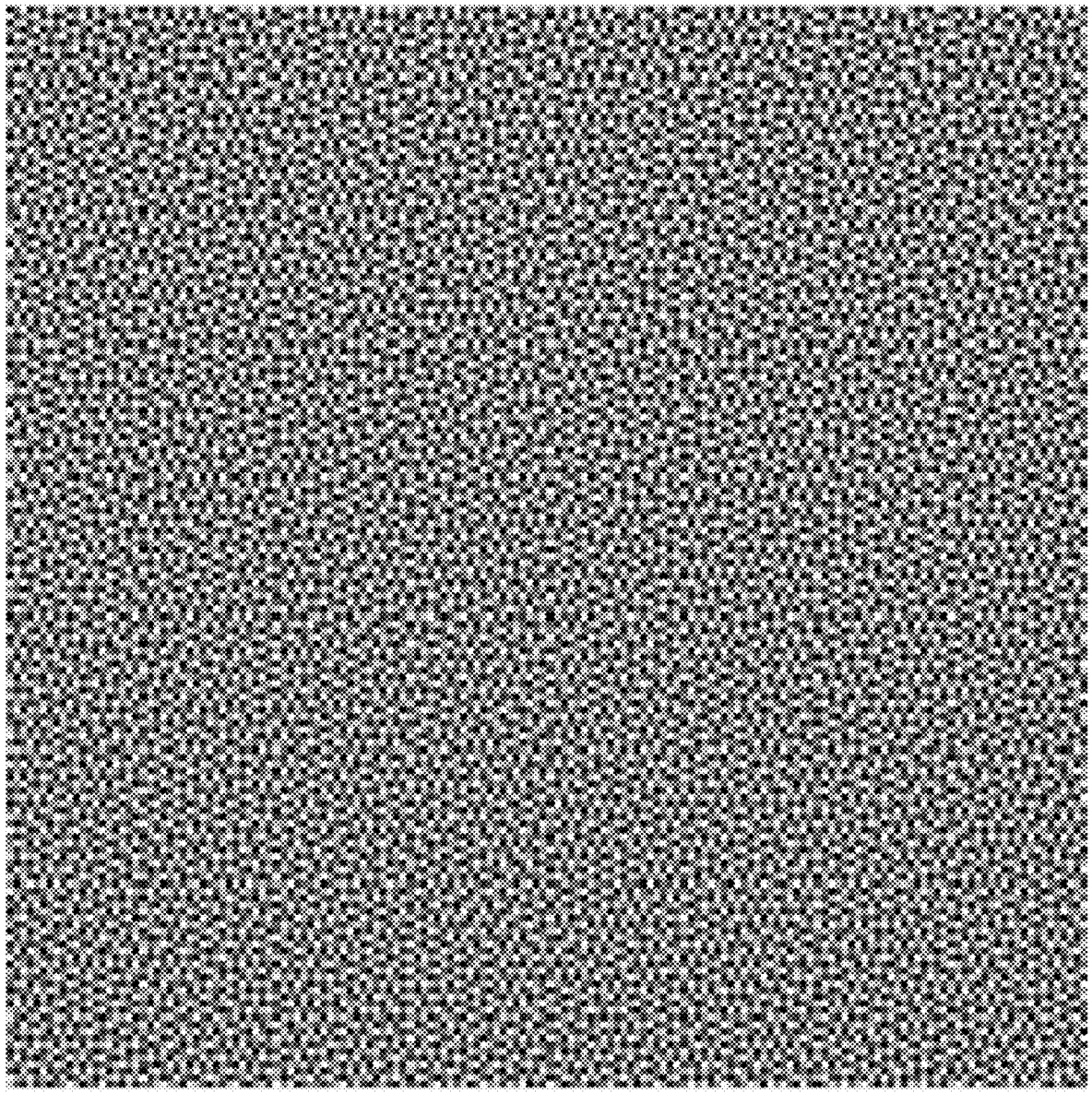
FIG. 12 is an illustration of a threshold array in accordance with the printing method of the first embodiment.

The threshold values T will vary between the different pixel locations in a pseudo-random fashion with integer values between 0 and 1028, where each number can be thought of as a grey value which is compared to the mapped tone value Cm. An example of an appropriate threshold array is illustrated by FIG. 12, which shows a stochastic threshold array. Since the threshold values vary in a pseudo-random manner, the probability of the mapped tone value Cm exceeding the threshold value T is given by the corresponding tone mapping function selected for the pixel. The dashed line in FIG. 10 therefore indicates the probability of a small dot 12 being printed, whereas the dotted line in FIG. 11 indicates the probability of a large dot 14 being printed. A solid line is shown alongside the tone mapping functions in FIGS. 10 and 11 for illustrative purposes only to indicate the probability of no dot being printed. The solid line decreases as the tone mapping functions increase so that for each tone value, the sum of the two probabilities equals 1.

The tone mapping functions are selected such that for light areas of the digital image (in this case for received tone values between 0 and 264), dots may only be printed from the first print array 16 and not from the second print array 18. At these received tone values, the probability of these smaller dots being printed is still less than 0.5 however and so the smaller dots will be sparsely arranged on the substrate. Smaller dots are more difficult to discern in isolation than larger dots and so by preventing the printing of larger dots from the second print array 18 as such, visible aberrations may advantageously be avoided. By then increasing the probability of a larger dot being printed at higher received tone values, as shown, different perceivable grey levels may be achieved, as well as a higher level of saturation whilst still keeping the dots as isolated as possible. In dark regions of an image printed at a 720×720 dpi resolution, it is expected that it will be difficult or impossible to see the modulation caused by printing alternate small and large dots as the dots will merge.

The use of a single threshold array for obtaining threshold values to compare against the mapped tone values obtained using the first or second tone mappings is advantageous because screening frequency clashes may hence be avoided. If a different threshold array were used for each of the first and second print arrays, the threshold arrays could interact so as to produce visual aberrations in the printed output.

It is desirable to prevent the clustering of dots within light areas of a printed image because a cluster of smaller dots can simulate larger dots, which are easier for the human eye to resolve. Such clustering can occur in prior art print heads where each nozzle is able to print dots of the smallest available size. The above arrangement of nozzles in the print head 20 however ensures that the smallest printed dots 12 must be separated by a minimum gap on the substrate of the corresponding to the pitch of the first print array 16. This ensures that these dots will not become clustered. Typically the smaller dots 12 will be separated by a larger distance on the substrate since a decision to emit a droplet will not always be made.

Steps 102 to 104 are repeated for any remaining pixels in the scan line, and then for each scan line in the digital image. A command sequence for the print head 20 is then compiled from outcomes of the decisions in step 104 for the various pixel locations. Screening may hence be performed in advance at a different time and a different location from the subsequent printing.

Once the screening process is complete, the printing process begins. The substrate is moved along the print direction, relative to the print head 20 and the command sequence is executed so as to cause a control signal to be generated for each pixel location where a droplet of ink is to be emitted at the appropriate time when the corresponding nozzle is located over the appropriate dot location on the substrate. This is step 105. A screened printed image is thereby formed on the substrate.

As will be appreciated, a method is provided for printing images at a faster rate without compromising the saturation or the resolution of the printed image. Furthermore this method enables halftone printing without the formation of visible aberrations in the printed output.

The invention claimed is:

1. A method of producing a printed output on a substrate using a print head comprising first and second print arrays, wherein the first and second print arrays each comprise a plurality of nozzles, wherein each of the nozzles of the first print array is configured to emit a droplet of a first volume in response to a respective control signal, and wherein each of the nozzles of the second print array is configured to emit a droplet of a second volume in response to a respective control signal, wherein the first volume is less than the second volume, the method comprising the steps of:
   a. receiving image data comprising a received tone value for a pixel within an image to be printed;
   b. selecting one of the print arrays of the first and second print arrays comprising a nozzle corresponding to the location of the pixel within the image to be printed, wherein each nozzle of the first and second print array is arranged to print a different respective pixel in the image data;

c. mapping the received tone value to a mapped tone value using a tone mapping corresponding to the selected first or second print array, wherein the tone mapping corresponding to the first print array is different from the tone mapping corresponding to the second print array;

d. performing the screening operation by comparing the mapped tone value with a threshold value for the location of the pixel within the image to be printed;

e. generating a control signal for the selected print array if the mapped tone value corresponds to the threshold value in a predetermined manner; and f. printing a dot onto a substrate from the selected nozzle in response to the generated control signal, wherein steps (a)-(f) are performed for a plurality of pixels within the image to be printed so as to form a printed output in the form of an array of dots, wherein the array of dots comprises dots of a first diameter and dots of a second diameter, wherein the first diameter is different from the second diameter, wherein the array of dots comprises rows of dots for the first and second diameters and wherein the first and second print arrays are actuated at different times so as to form each said row of dots.

2. A method according to claim 1, wherein each said droplet of the first volume forms a dot on the substrate having a first diameter, and wherein each said droplet of the second volume forms a dot on the substrate of having a second diameter, wherein the first diameter is less than the second diameter.

3. A method according to claim 1, wherein the first and second print arrays have an equal pitch and wherein the nozzles of the first print array are positioned in an alternating manner with respect to the nozzles of the second print array along the dimension in which the first and second lines extend.

4. A method according to claim 1, wherein the tone mapping is a function indicating the probability of a control signal being generated according to the received tone value.

5. A method according to claim 4, wherein said functions extend across three contiguous ranges of received tone values, wherein for a first range corresponding to lowest received tone values of the three contiguous ranges, the tone mapping corresponding to the first print array has a higher gradient than the tone mapping corresponding to the second print array.

6. A method according to claim 5, wherein for said first range the probability of a control signal being from the second print array is zero.

7. A method according to claim 5, wherein the tone mapping corresponding to the first print array has a positive gradient in each said range where the tone mapping corresponding to the second print array has a zero gradient, and wherein the tone mapping corresponding to the second print array has a positive gradient in each said range where the tone mapping corresponding to the first print array has a zero gradient.

8. A method according to claim 5, wherein the tone mapping corresponding to the first print array and the tone mapping corresponding to the second print array each have a constant gradient within said three ranges.

9. A method according to claim 5, wherein for a third range corresponding to the highest received tone values of the three contiguous ranges, the tone mapping corresponding to the first print array has a positive gradient and the tone mapping corresponding to the second print array has a zero gradient, and wherein for a second range extending between the first and third ranges, the tone mapping corresponding to the first print array has a zero gradient and the tone mapping corresponding to the second print array has a positive gradient.

10. A method according to claim 1, wherein step (c) comprises multiplying the received tone value by a tone mapping value for the received tone value to obtain the mapped tone value.

11. A method according to claim 1, wherein step (d) comprises looking up the threshold value from a threshold array using the location of the pixel within the image to be printed.

12. A method according to claim 11, wherein the threshold array comprises a set of threshold values, wherein each said threshold value is assigned to a respective pixel within the image to be printed.

13. A method according to claim 12, wherein the set of threshold values spans from a minimum received tone value to a maximum received tone value.

14. A method according to claim 1, wherein the mapped tone value corresponds to the threshold value in the predetermined manner if the mapped tone value exceeds the threshold value for the location of the pixel within the image to be printed.

15. A method according to claim 1, wherein the generated control signal indicates nozzle corresponding to the location of the pixel within the image to be printed.

16. A method according to claim 1, wherein the first print array is configured to print at a resolution of 360 dots per square inch and wherein the second print array is configured to print at a resolution of 360 dots per square inch, and wherein the first and second print arrays are actuated at different times so as to print a row of dots at a resolution of 720 dots per square inch.

17. A method according to claim 1, wherein the nozzles of the first print array are arranged along a first line and wherein the nozzles of the second print array are arranged along a second line, wherein the first line is parallel with the second line;

wherein the first and second print arrays have an equal pitch and wherein the nozzles of the first print array are positioned in an alternating manner with respect to the nozzles of the second print array along the dimension in which the first and second lines extend, wherein the first line and the second line are not collinear.

18. A method according to claim 17, wherein the nozzles of the first array are staggered with respect to the second array along the dimension in which the first and second lines extend.

19. An apparatus for producing a printed output on a substrate using a print head comprising:

first and second print arrays, wherein the first and second print arrays each comprise a plurality of nozzles, wherein each of the nozzles of the first print array is configured to emit a droplet of a first volume in response to a respective control signal, and wherein each of the nozzles of the second print array is configured to emit a droplet of a second volume in response to a respective control signal, wherein the first volume is less than the second volume;

one or more memories configured to store a program of instructions; and one or more processors configured to execute the instructions to perform:

a. receiving image data comprising a received tone value for a pixel within an image to be printed;
b. selecting one of the print arrays of the first and second print arrays comprising a nozzle corresponding to the location of the pixel within the image to be printed, wherein each nozzle of the first and second print array is arranged to print a different respective pixel in the image data;
c. mapping the received tone value to a mapped tone value using a tone mapping corresponding to the selected first or second print array, wherein the tone mapping corresponding to the first print array is different from the tone mapping corresponding to the second print array;
d. performing the screening operation by comparing the mapped tone value with a threshold value for the location of the pixel within the image to be printed;
e. generating a control signal for the selected print array if the mapped tone value corresponds to the threshold value in a predetermined manner; and
f. printing a dot onto a substrate from the selected nozzle in response to the generated control signal,
wherein steps (a)-(f) are performed for a plurality of pixels within the image to be printed so as to form a printed output in the form of an array of dots, wherein the array of dots comprises dots of a first diameter and dots of a second diameter, wherein the first diameter is different from the second diameter, wherein the array of dots comprises rows of dots for the first and second diameters and wherein the first and second print arrays are actuated at different times so as to form each said row of dots.

* * * * *